(12) United States Patent
Subbunarayanan et al.

(10) Patent No.: US 11,994,972 B2
(45) Date of Patent: *May 28, 2024

(54) SYSTEM AND METHOD FOR TESTING APPLICATIONS

(71) Applicant: The Toronto-Dominion Bank, Toronto (CA)

(72) Inventors: Periyakaruppan Subbunarayanan, Heidelberg (CA); Ramesh Raghunathan, Brampton (CA); Aayush Kathuria, Brampton (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,885

(22) Filed: Jun. 21, 2023

(65) Prior Publication Data

US 2023/0333965 A1    Oct. 19, 2023

Related U.S. Application Data

(63) Continuation of application No. 16/846,922, filed on Apr. 13, 2020, now Pat. No. 11,726,897.

(51) Int. Cl.
G06F 11/36    (2006.01)
(52) U.S. Cl.
CPC ...... G06F 11/3612 (2013.01); G06F 11/3664 (2013.01); G06F 11/3688 (2013.01); G06F 11/3692 (2013.01)
(58) Field of Classification Search
CPC ............. G06F 11/36–3696; G06F 11/34–3495
See application file for complete search history.

(56) References Cited

U.S. PATENT DOCUMENTS 7,032,214 B1    4/2006    Rodrigues et al.
7,209,864 B1    4/2007    Barr et al.
(Continued)

FOREIGN PATENT DOCUMENTS

CN    105389262 B    3/2016
CN    105468523 A    4/2016
(Continued)

OTHER PUBLICATIONS

Gligoric, Milos; Regression test selection: Theory and practice; University of Illinois at Urbana-Champaign, ProQuest Dissertations Year of Publication: 2015; https://search.proquest.com/docview/1752514074; Located via Proquest.
(Continued)

*Primary Examiner* — Todd Aguilera
(74) *Attorney, Agent, or Firm* — CPST Intellectual Property Inc.; Brett J. Slaney

(57) ABSTRACT

A system and method are provided for testing application. The method is executed by a device having a communications module and includes initiating via the communications module, an application testing tool, to test an application build according to at least one metric and obtain a test result. The method also includes accessing via the communications module, session details generated by the application testing tool while testing the application build, to determine an overhead component introduced by the application testing tool in generating the test result. The method also includes adjusting the test result based on the overhead component to increase an accuracy of the test result.

20 Claims, 10 Drawing Sheets

(56) References Cited

U.S. PATENT DOCUMENTS

| | | |
|---|---|---|
| 7,694,181 B2 | 4/2010 | Noller et al. |
| 8,381,192 B1 | 2/2013 | Drewry et al. |
| 8,504,994 B2 | 8/2013 | Golender et al. |
| 8,881,111 B1 | 11/2014 | Smith et al. |
| 8,972,940 B2 | 3/2015 | Kannan et al. |
| 9,021,438 B2 | 4/2015 | Dayan |
| 9,021,443 B1 | 4/2015 | Lachwani et al. |
| 9,053,242 B2 | 6/2015 | Smith et al. |
| 9,170,924 B2 | 10/2015 | Finch et al. |
| 9,703,681 B2 | 7/2017 | Taylor et al. |
| 10,372,600 B2 | 8/2019 | Mathur |
| 10,375,617 B2 | 8/2019 | Routt et al. |
| 10,489,281 B2 | 11/2019 | Cheung et al. |
| 10,514,999 B2 | 12/2019 | Subramanian Jayaraman et al. |
| 10,521,335 B2 | 12/2019 | Mitchell et al. |
| 11,726,897 B2 * | 8/2023 | Subbunarayanan ......... G06F 11/3419 717/125 |
| 2007/0083793 A1 | 4/2007 | Roth |
| 2007/0234293 A1 | 10/2007 | Noller et al. |
| 2010/0088683 A1 | 4/2010 | Golender et al. |
| 2015/0052499 A1 | 2/2015 | Finch |
| 2015/0347274 A1 | 12/2015 | Taylor et al. |
| 2017/0039200 A1 | 2/2017 | Galkin et al. |
| 2019/0327160 A1 | 10/2019 | Sivaprakasam et al. |
| 2020/0210592 A1 | 7/2020 | Karas |
| 2021/0318945 A1 * | 10/2021 | Subbunarayanan ......... G06F 11/3692 |

FOREIGN PATENT DOCUMENTS

| | | |
|---|---|---|
| CN | 105487982 A | 4/2016 |
| CN | 108509342 A | 9/2018 |
| CN | 109165167 A | 1/2019 |
| KR | 20080095527 A | 10/2008 |
| WO | 2019223070 A1 | 11/2019 |

OTHER PUBLICATIONS

Chan, Brian Yan Lun; Techniques and tools for mining pre-deployment testing data; Queen's University (Canada), ProQuest DissertationsDate of Publication: Sep. 2009; https://search.proquest.com/docview/760984374; Located via Proquest.

Chen, D. et al., "JVM for a Heterogenous Shared Memory System" Workshop on Caching Coherence and Consistency (WC3) [online], 2002 [retrieved Jul. 3, 2021], Retrieved from Internet: <URL:https://citeseerx.ist.psu.edu/viewdoc/download?doi=10.1.1.380.7392&rep+rep1&type=pdf>, pp. 1-10.

* cited by examiner

SYSTEM AND METHOD FOR TESTING APPLICATIONS

CROSS-REFERENCE TO RELATED APPLICATION(S)

This application is a Continuation of U.S. patent application Ser. No. 16/846,922 filed on Apr. 13, 2020, the contents of which are incorporated herein by reference in their entirety.

TECHNICAL FIELD

The following relates generally to testing applications.

BACKGROUND

As the number of mobile users increases, so too does the importance of measuring performance metrics on mobile devices. For example, it is found that users expect applications (also referred to herein as "apps") to load within a short amount of time, e.g., about two seconds. Because of this, some feel that native app load times should be as fast as possible. Additionally, poor app performance can impact an organization in other ways, for example, by increasing the number of technical service requests or calls, as well as negatively impacting ratings or rankings in application marketplaces (e.g., app stores), or more generally reviews or reputation. These negative impacts can also impact customer retention and uptake, particularly for younger generations who value their ability to perform many tasks remotely and with mobility.

Mobile performance testing typically measures key performance indicators (KPIs) from three perspectives, namely the end-user perspective, the network perspective, and the server perspective. The end-user perspective looks at installation, launch, transition, navigation, and uninstallation processes. The network perspective looks at network performance on different network types. The server perspective looks at transaction response times, throughput, bandwidth and latency. This type of testing is performed in order to identify root causes of application performance bottlenecks to fix performance issues, lower the risk of deploying systems that do not meet business requirements, reduce hardware and software costs by improving overall system performance, and support individual, project-based testing and centers of excellence.

In addition to the above technical challenges, user experience can more generally vary across devices, operating system (OS) type, and networks. This means that performance metrics should be tested, and development continually updated, across all of the devices that support an app.

A potential issue with addressing the above challenges is that app testing tools, particularly those that simulate user interface (UI) screen renderings, may be inaccurate in determining response times. For example, the time taken for user to login may be determined by simply implementing a start time after selecting the "Login" button and implementing an end time after verifying that the checkpoint of the subsequent screen is fully visible. The resulting time difference would yield results contrary to what the user would notice manually. Similar issues may be found with simulating app launch times and when monitoring application traffic flow.

BRIEF DESCRIPTION OF THE DRAWINGS

Embodiments will now be described with reference to the appended drawings wherein.

DETAILED DESCRIPTION

Figure 1:
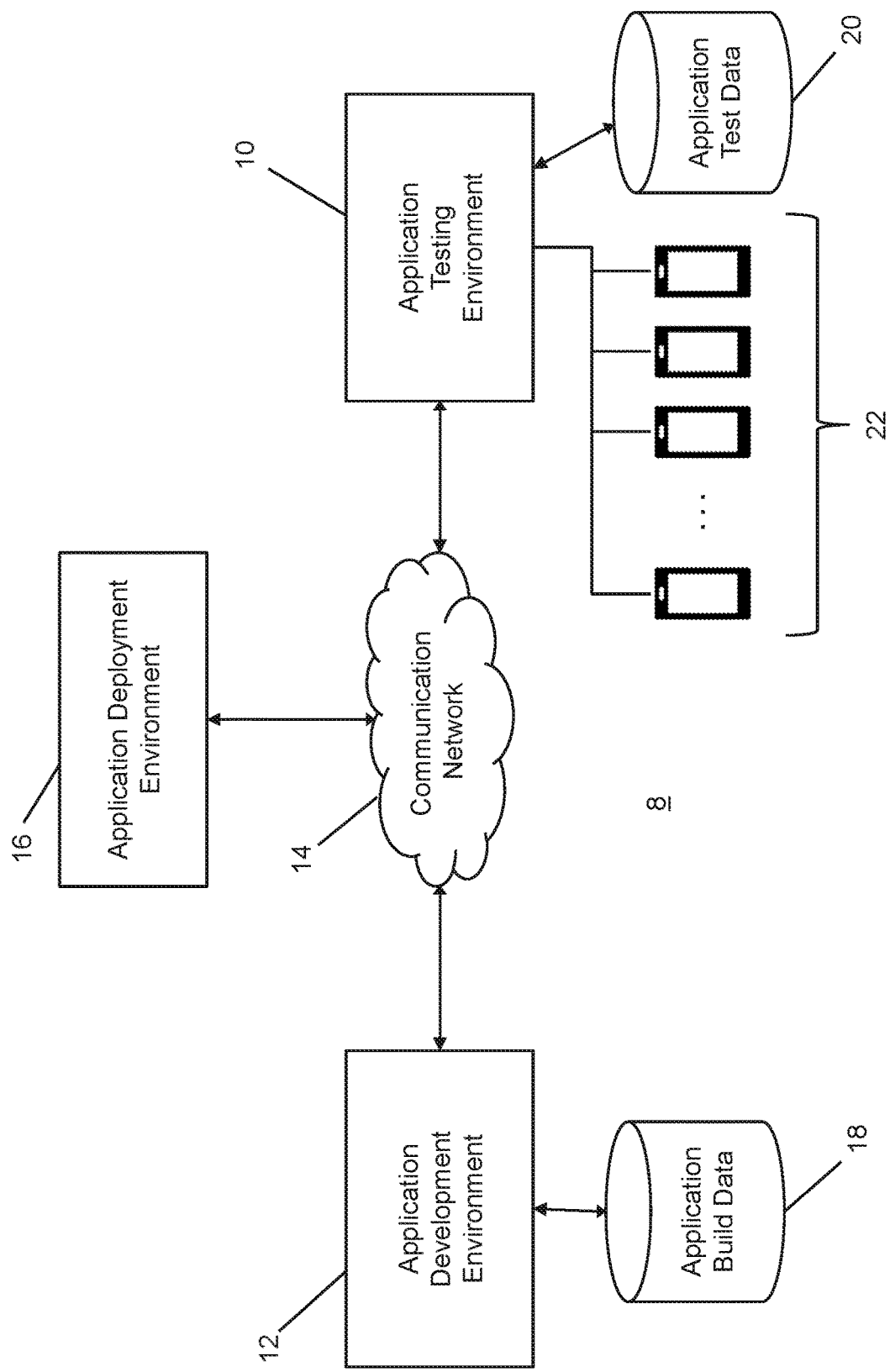
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The following generally relates to an application testing framework or application testing environment, which is integrated with an application development environment to enable automated periodic or continuous build performance testing under varied network and device conditions, and to provide a faster feedback loop for developers over all devices that use the application, particularly different types of mobile devices. That is, an application testing environment is provided as described herein, to automate the testing of app builds across different devices and device types (e.g., Android and iOS) on a frequent basis, e.g., daily.

As used herein a "build" may refer to the process of creating an application program for a software release, by taking all the relevant source code files and compiling them and then creating build artifacts, such as binaries or executable program(s), etc. "Build data" may therefore refer to any files or other data associated with a build. The terms "build" and "build data" (or "build file") may also be used interchangeably to commonly refer to a version or other manifestation of an application, or otherwise the code or program associated with an application that can be tested for performance related metrics.

The application testing environment may be capable of downloading and installing build files on to devices, running UI performance tests in parallel across multiple devices, and capturing application traffic logs.

In one aspect, to improve the integration of the testing and development environments, the computing environment described herein can be configured to execute an automated build download, retrieval, and installation process. An objective is to automate the testing of frequent app builds (e.g., nightly) by configuring the framework to download the latest builds and install these builds onto the devices that support the app.

In another aspect, to improve the accuracy of app testing tools used by the application testing environment, the application testing environment can also be configured to better estimate the time lags introduced by using the application testing tool and thus more accurately estimate the launch and response times. That is, the framework can include customized application testing techniques that leverage the existing application testing tool by using device logs or session details to estimate lag times that would normally be inaccurately included in the testing results. The logs or session details can be used in different ways depending on the type of test, as explained below.

As discussed above, the application testing environment can be configured to provide parallel execution on multiple devices. This involves numerous UI test flows to be run on multiple device types, e.g., Android and iOS devices. During test flow execution, the performance of the application across each device is tested, in which, the response time metrics are collected. This refers to collecting the amount of time it takes for a screen to be rendered from the front-end during test flows. For example, consider a UI test flow that involves testing the login functionality of the application. This would involve collecting response time metrics related to app launch time, time to navigate to login screen, and time to login.

There is provided herein, a solution that can involve automating the tasks necessary to monitor and capture the application traffic logs. The application testing environment can trigger the respective business flow on the application under test, and alongside, a proxy tool can capture the logs being made for each user action such as launching an app, selecting or initiating a login, selecting an account registered for a user ID, etc. Upon completion of the business flow, the corresponding file containing the logs can be downloaded by navigating to a uniform resource locator (URL) provided by a web interface for the proxy tool. This process can be performed for the remaining flows in the test suite. Then, the corresponding logs could be seen visually in the form of a dashboard.

It will be appreciated that while examples provided herein may be primarily directed to automated testing of mobile applications, the principles discussed herein equally apply to applications deployed on or otherwise used by other devices, such as desktop or laptop computers, e.g., to be run on a web browser or locally installed instance of an application.

Certain example systems and methods described herein are able to test applications and adjust test results based on an overhead component determined from session details. In one aspect, there is provided a device for testing applications. The device includes a processor, a communications module coupled to the processor, and a memory coupled to the processor. The memory stores computer executable instructions that when executed by the processor cause the processor to initiate via the communications module, an application testing tool, to test an application build according to at least one metric and obtain a test result. The computer executable instructions, when executed, also cause the processor to access via the communications module, session details generated by the application testing tool while testing the application build, to determine an overhead component introduced by the application testing tool in generating the test result. The computer executable instructions, when executed, also cause the processor to adjust the test result based on the overhead component to increase an accuracy of the test result.

In another aspect, there is provided a method of testing applications. The method is executed by a device having a communications module. The method includes initiating via the communications module, an application testing tool, to test an application build according to at least one metric and obtain a test result. The method also includes accessing via the communications module, session details generated by the application testing tool while testing the application build, to determine an overhead component introduced by the application testing tool in generating the test result. The method also includes adjusting the test result based on the overhead component to increase an accuracy of the test result.

In another aspect, there is provided a non-transitory computer readable medium for testing applications. The computer readable medium includes computer executable instructions for initiating via the communications module, an application testing tool, to test an application build according to at least one metric and obtain a test result. The computer readable medium also includes instructions for accessing via the communications module, session details generated by the application testing tool while testing the application build, to determine an overhead component introduced by the application testing tool in generating the test result. The computer readable medium also includes instructions for adjusting the test result based on the overhead component to increase an accuracy of the test result.

In certain example embodiments, the at least one metric can include a user interface response time, with the overhead component can include a time associated with application programming interface calls between a testing tool driver and a server.

In certain example embodiments the at least one metric can include an application launch time, with the overhead component being determined from logs generated by the application testing tool.

In certain example embodiments, the device can initiate a proxy tool to monitor and capture application traffic logs; and capture, by the proxy tool, logs generated for a plurality of user actions, alongside a business flow being executed by the application under test. The device can also provide the traffic logs to a proxy tool user interface.

In certain example embodiments the device can run in parallel with the application testing tool to determine the overhead component from the session details without adding additional overhead to the test. The overhead component can be determined by comparing the session details to corresponding testing actions to generate a report for a developer associated with the application build.

In certain example embodiments the device can automatically request, via the communications module, a latest application build from an application development environment, prior to initiating the application testing tool.

In certain example embodiments testing the application build can include one or more of an end-user performance test, a network performance test, or a server performance test. Here, testing the application build can include executing at least one test for each of a plurality of environments, the plurality of environments comprising one or more of a device environment, a network environment, or a server environment.

In certain example embodiments a plurality of tests can be performed to obtain data under different conditions.

In certain example embodiments the device can be configured to test the application build in parallel on a plurality of device types.

FIG. 1 illustrates an exemplary computing environment 8. In this example, the computing environment 8 may include an application testing environment 10, an application development environment 12, and a communications network 14 connecting one or more components of the computing environment 8. The computing environment 8 may also include or otherwise be connected to an application deployment environment 16, which provides a platform, service, or other entity responsible for posting or providing access to applications that are ready for use by client devices. The application development environment 12 includes or is otherwise coupled to one or more repositories or other data storage elements for storing application build data 18. The application build data 18 can include any computer code and related data and information for an application to be deployed, e.g., for testing, execution or other uses.

In this example, the application build data 18 can be provided via one or more repositories and include the data and code required to perform application testing on a device or simulator. It can be appreciated that while FIG. 1 illustrates a number of test devices 22 that resemble a mobile communication device, such testing devices 22 can also include simulators, simulation devices or simulation processes, all of which may be collectively referred to herein as "test devices 22" for ease of illustration. The application testing environment 10 may include or otherwise have access to one or more repositories or other data storage elements for storing application test data 20, which includes any files, reports, information, results, metadata or other data associated with and/or generated during a test implemented within the application testing environment 10. As shown in FIG. 1, the application test data 20 can be made available to various entities, e.g., to review, analyze or otherwise consume the results, for example, a dashboard 58 (see FIG. 3—described below).

The computing environment 8 may be part of an enterprise or other organization that both develops and tests applications. In such cases, the communication network 14 may not be required to provide connectivity between the application development environment 12 and the application testing environment 10, wherein such connectivity is provided by an internal network. The application development environment 12 and application testing environment 10 may also be integrated into the same enterprise environment as subsets thereof. That is, the configuration shown in FIG. 1 is illustrative only. Moreover, the computing environment 8 can include multiple enterprises or organizations, e.g., wherein separate organizations are configured to, and responsible for, application testing and application development. For example, an organization may contract a third-party to develop an app for their organization but perform testing internally to meet proprietary or regulatory requirements. Similarly, an organization that develops an app may outsource the testing stages, particularly when testing is performed infrequently. The application deployment environment 16 may likewise be implemented in several different ways. For example, the deployment environment 16 may include an internal deployment channel for employee devices, may include a public marketplace such as an app store, or may include any other channel that can make the app available to clients, consumers or other users.

One example of the computing environment 8 may include a financial institution system (e.g., a commercial bank) that provides financial services accounts to users and processes financial transactions associated with those financial service accounts. Such a financial institution system may provide to its customers various browser-based and mobile applications, e.g., for mobile banking, mobile investing, mortgage management, etc.

Test devices 22 can be, or be simulators for, client communication devices that would normally be associated with one or more users. Users may be referred to herein as customers, clients, correspondents, or other entities that interact with the enterprise or organization associated with the computing environment 8 via one or more apps. Such client communication devices are not shown in FIG. 1 since such devices would typically be used outside of the computing environment 8 in which the development and testing occurs. However, it may be noted that such client communication devices may be connectable to the application deployment environment 16, e.g., to download newly developed apps, to update existing apps, etc. In certain embodiments, a user may operate the client communication devices such that client device performs one or more processes consistent with what is being tested in the disclosed embodiments. For example, the user may use client device to engage and interface with a mobile or web-based banking application which has been developed and tested within the computing environment 8 as herein described. In certain aspects, test devices 22 and client device can include, but are not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 14 shown by way of example in FIG. 1.

Communication network 14 may include a telephone network, cellular, and/or data communication network to connect different types of client devices. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

Referring back to FIG. 1, the computing environment 8 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the application development environment 12 and/or application testing environment 10. The cryptographic server may be used to protect data within the computing environment 8 (include the application build data 18 and/or application test data 20) by way of encryption for data protection, digital signatures or message digests for data integrity, and by using digital certificates to authenticate the identity of the users and entity devices with which the application development environment 12 and application testing environment 10 communicate to inhibit data breaches by adversaries. It can be appreciated that various cryptographic mechanisms and protocols can be chosen and implemented to suit the constraints and requirements of the particular deployment of the application development environment 12 and application testing environment 10 as is known in the art.

Figure 2:
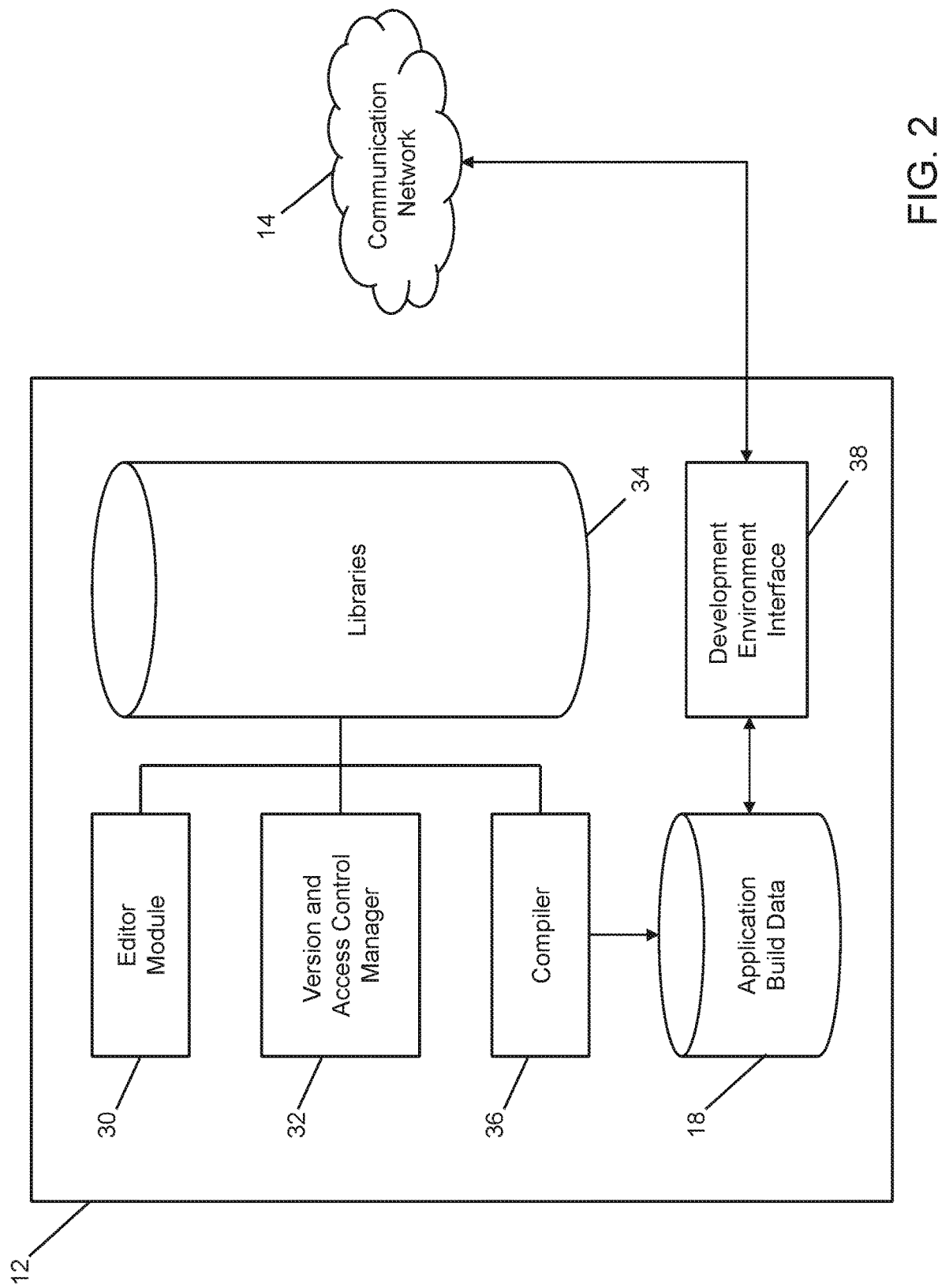
FIG. 2 is a block diagram of an example configuration of an application development environment.

In FIG. 2, an example configuration of the application development environment 12 is shown. It can be appreciated that the configuration shown in FIG. 2 has been simplified for ease of illustration. In certain example embodiments, the application development environment 12 may include an editor module 30, a version and access control manager 32, one or more libraries 34, and a compiler 36, which would be typical components utilized in application development. In this example, the application development environment 12 also includes the application build data 18, which, while shown within the environment 12, may also be a separate entity (e.g., repository) used to store and provide access to the stored build files. The application development environment 12 also includes or is provided with (e.g., via an application programming interface (API)), a development environment interface 38. The development environment interface 38 provides communication and data transfer capabilities between the application development environment 12 and the application testing environment 10 from the perspective of the application development environment 12. As shown in FIG. 2, the development environment interface 38 can connect to the communication network 14 to send/receive data and communications to/from the application testing environment 10 as discussed further below. For example, the testing environment interface 38 can be used to provide test results to the application development environment 12 based on testing conducted in the application testing environment 10.

The editor module 30 can be used by a developer/programmer to create and edit program code associated with an application being developed. This can include interacting with the version and access control manager 32 to control access to current build files and libraries 34 while enforcing permissions and version controls. The compiler 36 may then be used to compile an application build file and other data to be stored with the application build data 18. It can be appreciated that a typical application or software development environment 12 may include other functionality, modules, and systems, details of which are omitted for brevity and ease of illustration. It can also be appreciated that the application development environment 12 may include modules, accounts, and access controls for enabling multiple developers to participate in developing an application, and modules for enabling an application to be developed for multiple platforms. For example, a mobile application may be developed by multiple teams, each team potentially having multiple programmers. Also, each team may be responsible for developing the application on a different platform, such as APPLE IOS or GOOGLE ANDROID for mobile versions, and GOOGLE CHROME or MICROSOFT EDGE for web browser versions. Similarly, applications may be developed for deployment on different device types, even with the same underlying operating system.

By having build files stored for all of the various operating systems, device types, and versions that are currently compatible and being used, and providing access via the development environment interface 38, the application testing environment 10 can automatically obtain and deploy the latest builds to perform application testing in different scenarios. Such scenarios can include not only different device types, operating systems, and versions, but also the same build under different operating conditions.

While not shown in FIG. 2 for clarity of illustration, in example embodiments, the application development environment 12 may be implemented using one or more computing devices such as terminals, servers, and/or databases, having one or more processors, communications modules, and database interfaces. Such communications modules may include the development environment interface 38, which enables the application development environment 12 to communicate with one or more other components of the computing environment 8, such as the application testing environment 10, via a bus or other communication network, such as the communication network 14. While not delineated in FIG. 2, the application development environment 12 (and any of its devices, servers, databases, etc.) includes at least one memory or memory device that can include a tangible and non-transitory computer-readable medium having stored therein computer programs, sets of instructions, code, or data to be executed by the one or more processors. FIG. 2 illustrates examples of modules, tools and engines stored in memory within the application development environment 12. It can be appreciated that any of the modules, tools, and engines shown in FIG. 2 may also be hosted externally and be available to the application development environment 12, e.g., via communications modules such as the development environment interface 38.

Figure 3:
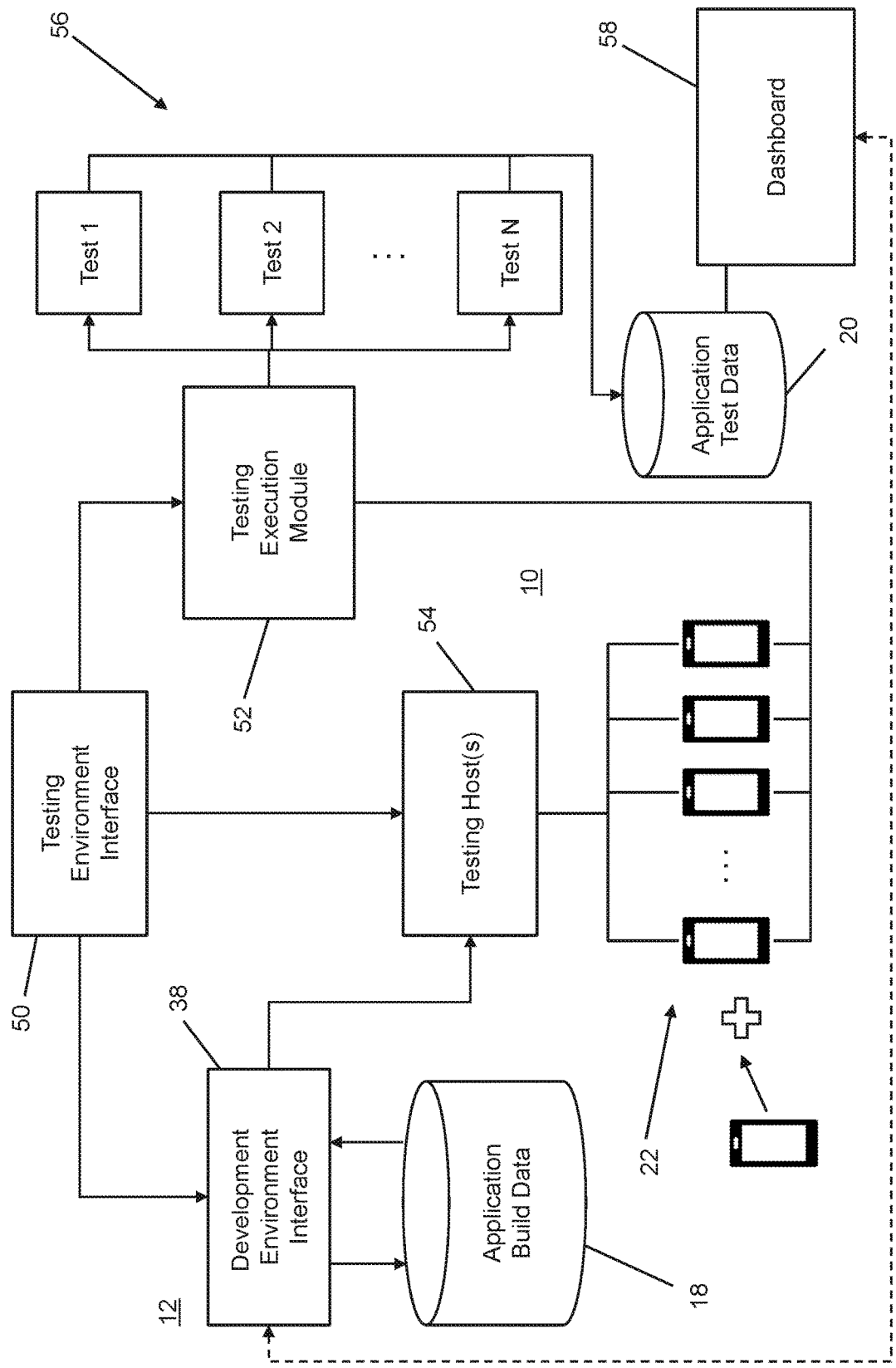
FIG. 3 is a block diagram of an example configuration of an application testing environment.

Turning now to FIG. 3, an example configuration of the application testing environment 10 is shown. The application testing environment 10 includes a testing environment interface 50, which is coupled to the development environment interface 38 in the application development environment 12, a testing execution module 52, and one or more testing hosts 54. The testing environment interface 50 can provide a UI for personnel or administrators in the application testing environment 10 to coordinate an automated build management process as herein described and to initiate or manage a test execution process as herein described.

The testing environment interface 50 can instruct the development environment interface 38, e.g., by sending a message or command via the communication network 14, to access the application build data 18 to obtain the latest application build(s) based on the number and types of devices being tested by the testing host(s) 54. The latest application builds are then returned to the application testing environment 10 by the development environment interface 38 to execute an automated build retrieval operation. As shown in FIG. 3, the application build data 18 can be sent directly to the testing host(s) 54 and thus the testing host(s) 54 can also be coupled to the communication network 14. It can be appreciated that the application build data 18 can also be provided to the testing host(s) 54 via the testing environment interface 50. The host(s) 54 in this example have access to a number of test devices 22 which, as discussed above, can be actual devices or simulators for certain devices. The testing host(s) 54 are also scalable, allowing for additional test devices 22 to be incorporated into the application testing environment 10. For example, a new test device 22 may be added when a new device type is released and will be capable of using the application being tested. Upon installation, the application on each test device 22 can be configured to point to the appropriate environment under test and other settings can be selected/deselected.

The test devices 22 are also coupled to the testing execution module 52 to allow the testing execution module 52 to coordinate tests 56 to evaluate metrics, for example, by executing tests for application traffic monitoring, determining UI response times, examining device logs, and determining resource utilization metrics (with Test 1, Test 2, . . . , Test N; shown generally in FIG. 3 for illustrative purposes). The tests 56 can generate data logs, reports and other outputs, stored as application test data 20, which can be made available to various entities or components, such as the dashboard 58. The framework shown in FIG. 3 enables the application testing environment 10 to download the latest builds from the respective repositories for the respective device/OS platform(s) and run a UI flow on all test devices 22 to configure the environment, disable system pop-ups, and set feature flags. In this way, the framework can automate the build download and installation process. Similarly, as describe below, the testing executing module 52 can be configured to estimate the time lags introduced by using an application testing tool 57 (see FIG. 4 described below) and thus more accurately estimate the launch and response times. That is, the framework illustrated in FIG. 3 can include customized app testing tools that leverage the existing application testing tool 57 by using device logs or session details to estimate lag times that would normally be inaccurately included in the testing results.

It can be appreciated that while the testing environment interface 50, the testing host(s) 54, and the testing execution module 52 are shown as separate modules in FIG. 3, such modules may be combined in other configurations and thus the delineations shown in FIG. 3 are for illustrative purposes.

Figure 4:
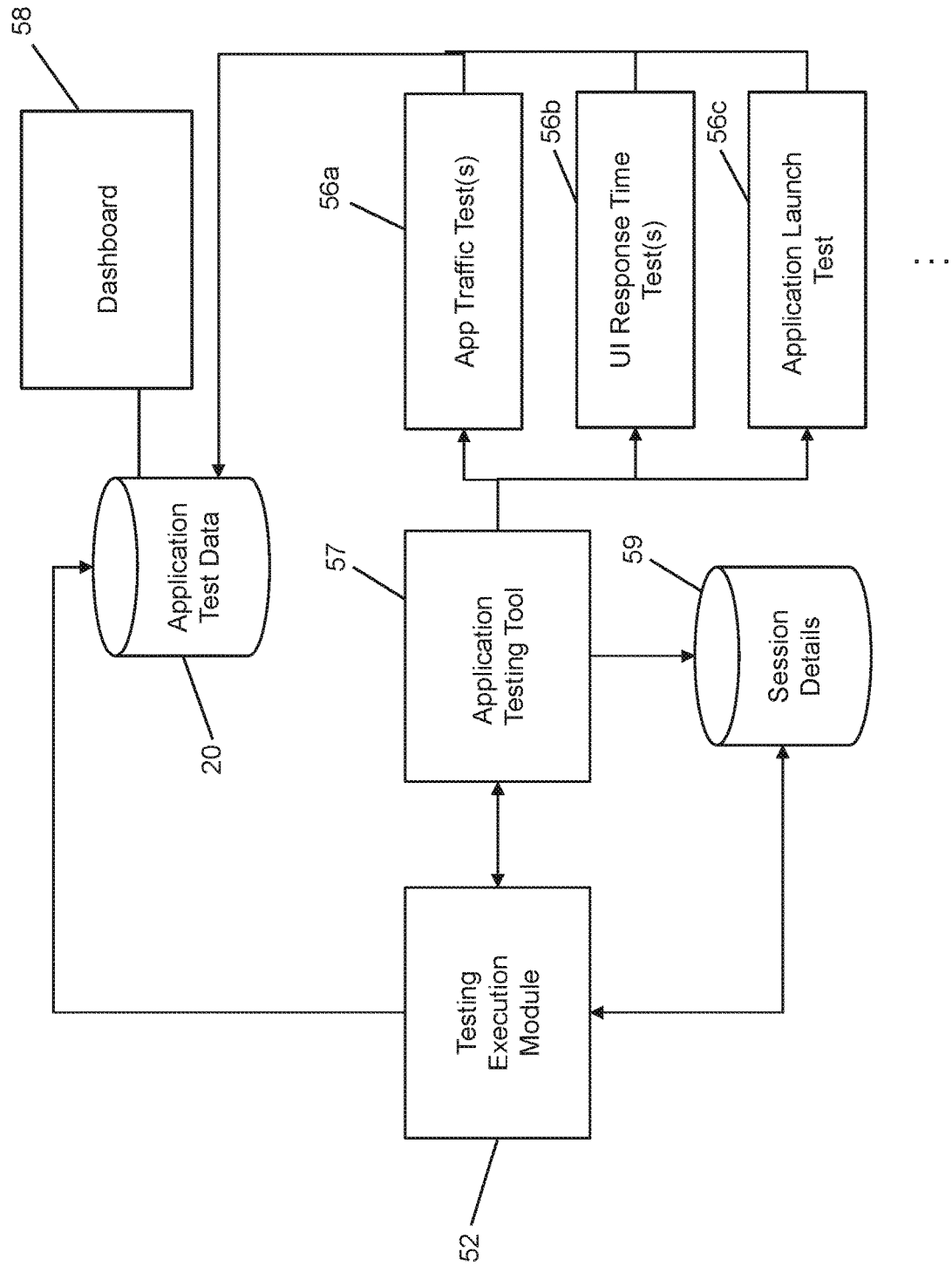
FIG. 4 is a block diagram of an example configuration of an application testing tool coupled to the testing execution module of FIG. 3.

Turning now to FIG. 4, an example of a configuration for the testing execution module 52 to adjust test results generated by use of an application testing tool 57, is shown. The testing execution module 52 is coupled to the application testing tool 57 to initiate and coordinate testing of app builds, e.g., as discussed above. The application testing tool 57 includes or has access to session details 59, which may include a log, report, or other data associated with a test and stored by the application testing tool 57 for and/or during a test. In this example, three tests 56 are illustrated, namely an app traffic test 56a, a UI response time test 56b, and an application launch test 56c. While performing these tests, the application testing tool 57 not only generates application test data 20 but can also store session details 59. As described further below, the testing execution module 52 can access the session details 59 to determine an overhead component associated with a test 56 and adjust the application test data 20 and/or the report or other results associated with the test 56. This can be visualized using the dashboard 58, reported back to the application development environment 12, or itemized, documented or specified in any other suitable manner.

The UI automation functionality being used by the application testing tool 57 may not be capable of determining an accurate response time of the UI rendering for a screen, e.g., in implementing a UI response time test 56b. To address this challenge, the testing execution module 52 can account for the fact that API calls made between a driver and a server used by the application testing tool 57 may result in a significant amount of overhead time, thus causing a noticeable increase in the recorded response time metrics. This overhead can be removed by retrieving the time taken for the driver to find an element from the session details 59 of the driver itself. The session details 59 can provide the amount of time taken by the driver to perform certain tasks such as creating a session, finding an element, etc. Upon capturing the overhead time, this time could be deducted from the total time taken to capture the accurate UI response times in a UI response time test 56b.

In terms of the user perspective, the app launch time determined from an application launch test 56c may be considered a particularly important response time metric for many applications. For example, a long application launch time could impact the ability of a user to perform a critical operation or may risk losing such an existing or a potential customer. To ensure long term user satisfaction, a goal may be to minimize the time taken for the application to load. With the application testing environment 10 the testing execution module 52 can be configured to capture the application launch time on the various devices, device types, test conditions, etc. This can be implemented by instructing the application testing tool 57 to launch the application and execute logic to capture the time taken for the application to completely load. The application testing tool 57 may be configured to provide a command to launch the application under test. Although this command would successfully launch an application the application testing tool 57 may not capture the accurate app launch time.

Similarly, in testing other types of devices, the same command may uninstall and re-install the application. Therefore, a modified approach may be implemented to measure the application launch time for an application launch test 56c. The modified approach may use a combination of platform-specific developer tools and the application testing tool 57 to launch the app and determine the app launch time from the logs provided by the tools (stored in this example in the session details 59). In one example, for an Android device, the adb (Android device bridge) command line tool, which is used to communicate with Android devices via the command line for debugging apps, can be used. The adb tool provides a capability to not only launch the application but also provide details of the total time taken for application launch. With regards to iOS devices, the start and end times of the application launch could be retrieved from the application testing tool session details 59 for each test device 22. It can be appreciated that the aforementioned logs, session details or other data related to the execution of a test may be generally referred to herein as "session details 59" for ease of illustration.

Another test 56 shown in FIG. 4 is the app traffic monitoring test 56a. In this type of test, for each UI test flow, the corresponding UI test script can be executed to run on a device to capture the logs in the host machine. Upon completion of the execution, the corresponding logs may be displayed in the dashboard 58. In typical testing scenarios, the process of capturing application traffic to troubleshoot application issues is performed manually. The app would be debugged by running a proxy in the host machine and have the device connect to the proxy. Then, the user would perform the test flow to reproduce the error while the app traffic logs are being captured in the proxy tool. Finally, the user would have to download the file containing the logs before sending it to the development team for further investigation and troubleshooting. For every new build artifact, it is necessary to capture the network calls for various business flows. Considering this, it would be cumbersome to perform this manually for a large number of business flows.

To address these challenges, the testing execution module 52 can be configured to automate the tasks necessary to monitor and capture the application traffic logs. The testing execution module 52 can trigger the respective business flow on the application under test, and alongside, a proxy tool would capture the logs being made for each user action such as launching app, clicking login, clicking on an account registered for a user ID, etc. Upon completion of the business flow, the corresponding file containing the logs can be downloaded by navigating to a URL provided by the proxy tool web interface. This process would be performed for the remaining flows in the test suite. In the example configuration shown in FIG. 4, the downloaded data can be stored as session details 59 for use as described herein. In this way, the corresponding logs can also be seen visually in the form of a dashboard, which can be separate from or integrated into the dashboard 58.

Figure 5:
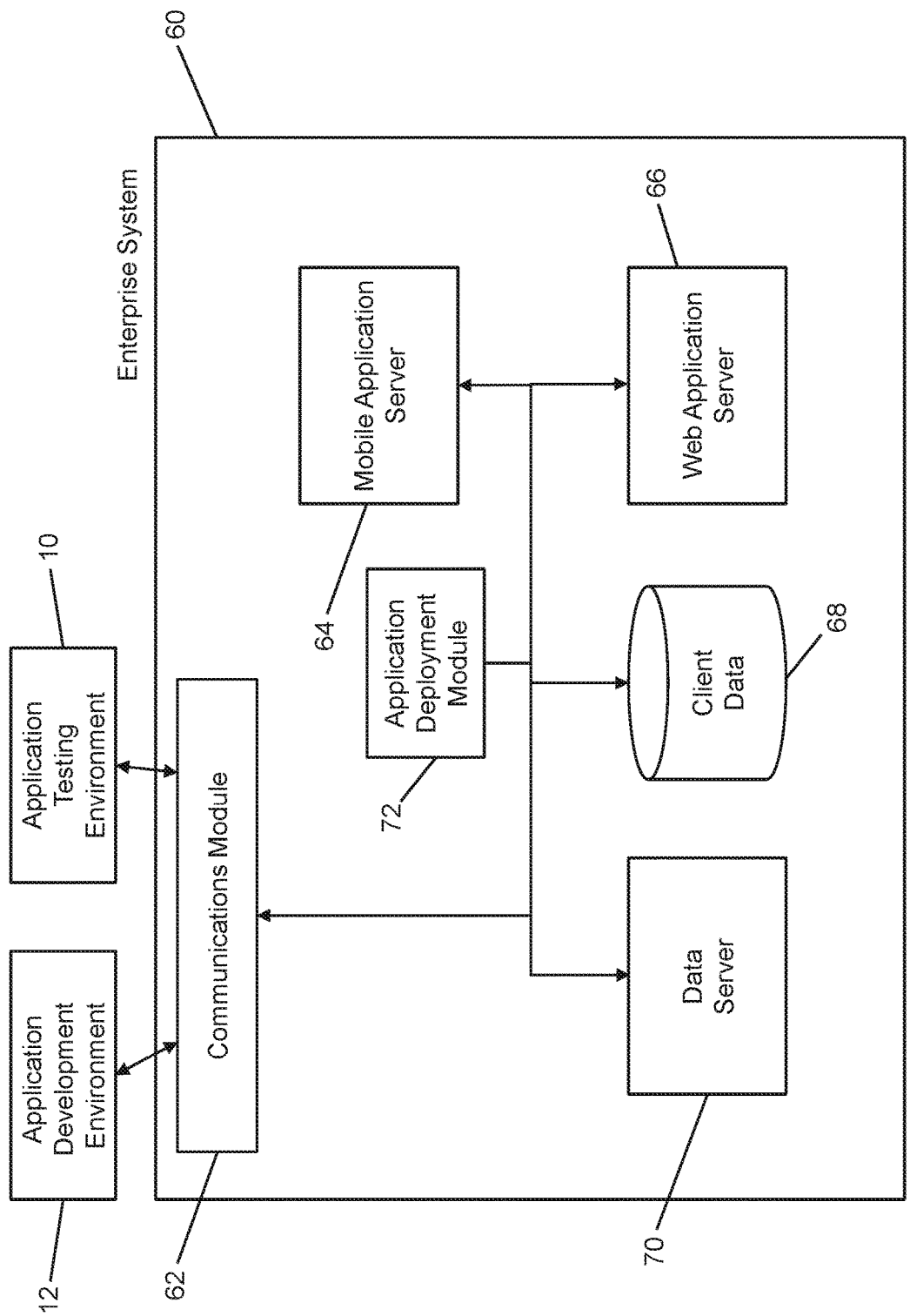
FIG. 5 is a block diagram of an example configuration of an enterprise system.

In FIG. 5, an example configuration of an enterprise system 60 is shown. The enterprise system 60 includes a communications module 62 that enables the enterprise system 60 to communicate with one or more other components of the computing environment 8, such as the application testing environment 10 or application development environment 12, via a bus or other communication network, such as the communication network 14. While not delineated in FIG. 5, the enterprise system 60 includes at least one memory or memory device that can include a tangible and non-transitory computer-readable medium having stored therein computer programs, sets of instructions, code, or data to be executed by one or more processors (not shown for clarity of illustration). FIG. 5 illustrates examples of servers and datastores/databases operable within the enterprise system 60. It can be appreciated that any of the components shown in FIG. 5 may also be hosted externally and be available to the enterprise system 60, e.g., via the communications module 62. In the example embodiment shown in FIG. 5, the enterprise system 16 includes one or more servers to provide access to client data 68, e.g., for development or testing purposes. Exemplary servers include a mobile application server 64, a web application server 66 and a data server 70. Although not shown in FIG. 5, as noted above, the enterprise system 60 may also include a cryptographic server for performing cryptographic operations and providing cryptographic services. The cryptographic server can also be configured to communicate and operate with a cryptographic infrastructure. The enterprise system 60 may also include one or more data storage elements for storing and providing data for use in such services, such as data storage for storing client data 68.

Mobile application server 64 supports interactions with a mobile application installed on client device (which may be similar or the same as a test device 22). Mobile application server 64 can access other resources of the enterprise system 60 to carry out requests made by, and to provide content and data to, a mobile application on client device. In certain example embodiments, mobile application server 64 supports a mobile banking application to provide payments from one or more accounts of user, among other things.

Web application server 66 supports interactions using a website accessed by a web browser application running on the client device. It can be appreciated that the mobile application server 64 and the web application server 66 can provide different front ends for the same application, that is, the mobile (app) and web (browser) versions of the same application. For example, the enterprise system 60 may provide a banking application that be accessed via a smartphone or tablet app while also being accessible via a browser on any browser-enabled device.

The client data 68 can include, in an example embodiment, financial data that is associated with users of the client devices (e.g., customers of the financial institution). The financial data may include any data related to or derived from financial values or metrics associated with customers of a financial institution system (i.e. the enterprise system 60 in this example), for example, account balances, transaction histories, line of credit available, credit scores, mortgage balances, affordability metrics, investment account balances, investment values and types, among many others. Other metrics can be associated with the financial data, such as financial health data that is indicative of the financial health of the users of the client devices.

An application deployment module 72 is also shown in the example configuration of FIG. 5 to illustrate that the enterprise system 60 can provide its own mechanism to deploy the developed and tested applications onto client devices within the enterprise. It can be appreciated that the application deployment module 72 can be utilized in conjunction with a third-party deployment environment 16 such as an app store to have tested applications deployed to employees and customers/clients.

Figure 6:
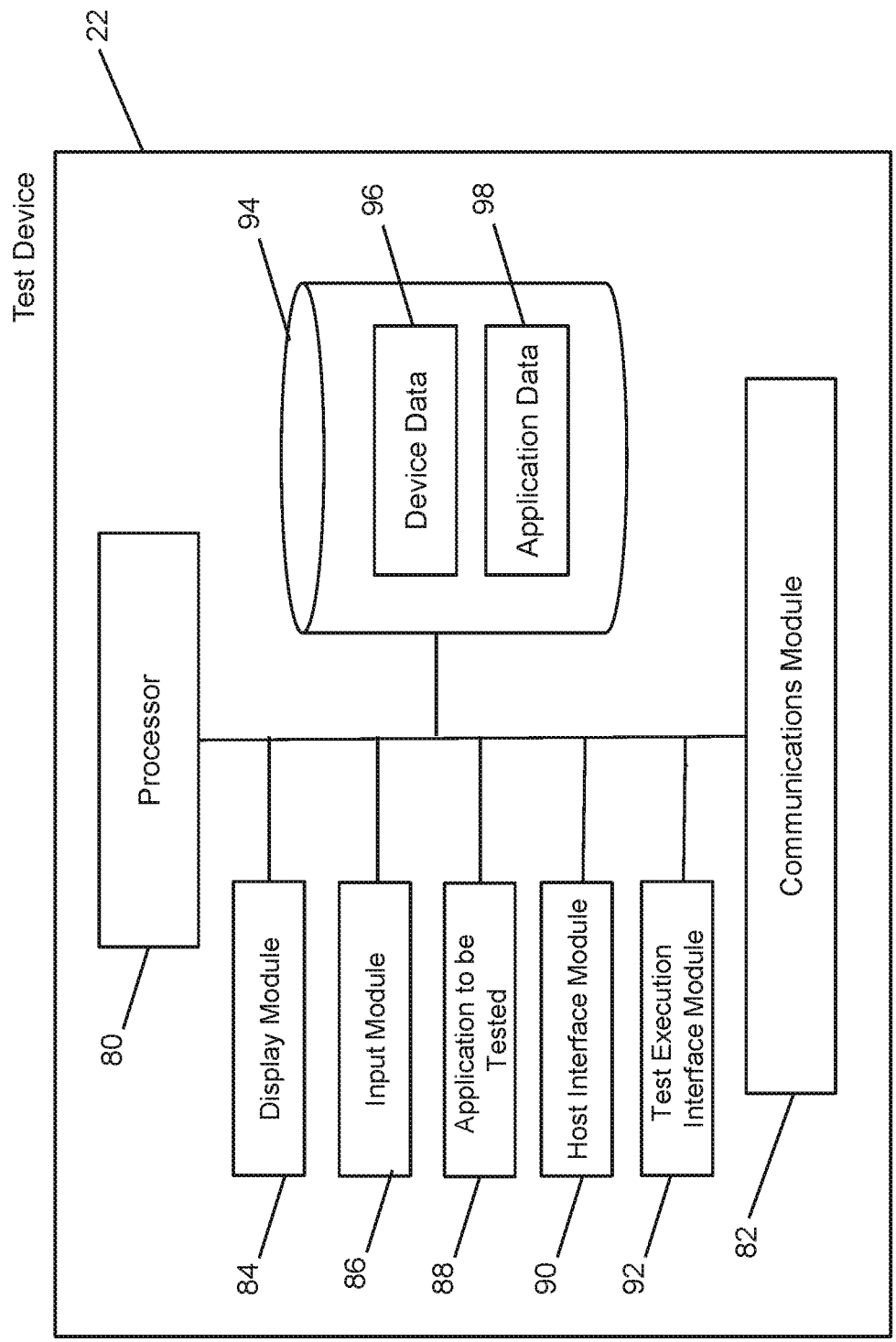
FIG. 6 is a block diagram of an example configuration of a test device used to test an application build in the application testing environment.

In FIG. 6, an example configuration of a test device 22 is shown. It can be appreciated that the test device 22 shown in FIG. 6 can correspond to an actual device or represent a simulation of such a device 22. In certain embodiments, the client device 22 may include one or more processors 80, a communications module 82, and a data store 94 storing device data 96 and application data 98. Communications module 82 enables the test device 22 to communicate with one or more other components of the computing environment 8 via a bus or other communication network, such as the communication network 14. While not delineated in FIG. 6, the client device 22 includes at least one memory or memory device that can include a tangible and non-transitory computer-readable medium having stored therein computer programs, sets of instructions, code, or data to be executed by processor 80. FIG. 6 illustrates examples of modules and applications stored in memory on the test device 22 and operated by the processor 80. It can be appreciated that any of the modules and applications shown in FIG. 5 may also be hosted externally and be available to the test device 22, e.g., via the communications module 82.

In the example embodiment shown in FIG. 6, the test device 22 includes a display module 84 for rendering GUIs and other visual outputs on a display device such as a display screen, and an input module 86 for processing user or other inputs received at the test device 22, e.g., via a touchscreen, input button, transceiver, microphone, keyboard, etc. The test device 22 may also include an application 88 to be tested that includes the latest application build data 18 to be tested using the test device 22, e.g., by executing tests 56. The test device 22 may include a host interface module 90 to enable the test device 22 to interface with a testing host 54 for loading an application build. The test device 22 in this example embodiment also includes a test execution interface module 92 for interfacing the application 88 with the testing execution module 52. The data store 94 may be used to store device data 96, such as, but not limited to, an IP address or a MAC address that uniquely identifies test device 22. The data store 94 may also be used to store application data 98, such as, but not limited to, login credentials, user preferences, cryptographic data (e.g., cryptographic keys), etc.

It will be appreciated that only certain modules, applications, tools and engines are shown in FIGS. 2 to 6 for ease of illustration and various other components would be provided and utilized by the application testing environment 10, application development environment 12, and test device 22, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in the application testing environment 10, application development environment 12, enterprise system 60 or test device 22, or accessible or connectable thereto. Any application or module herein described may be implemented using computer readable/executable instructions that may be stored or otherwise held by such computer readable media.

Figure 7:
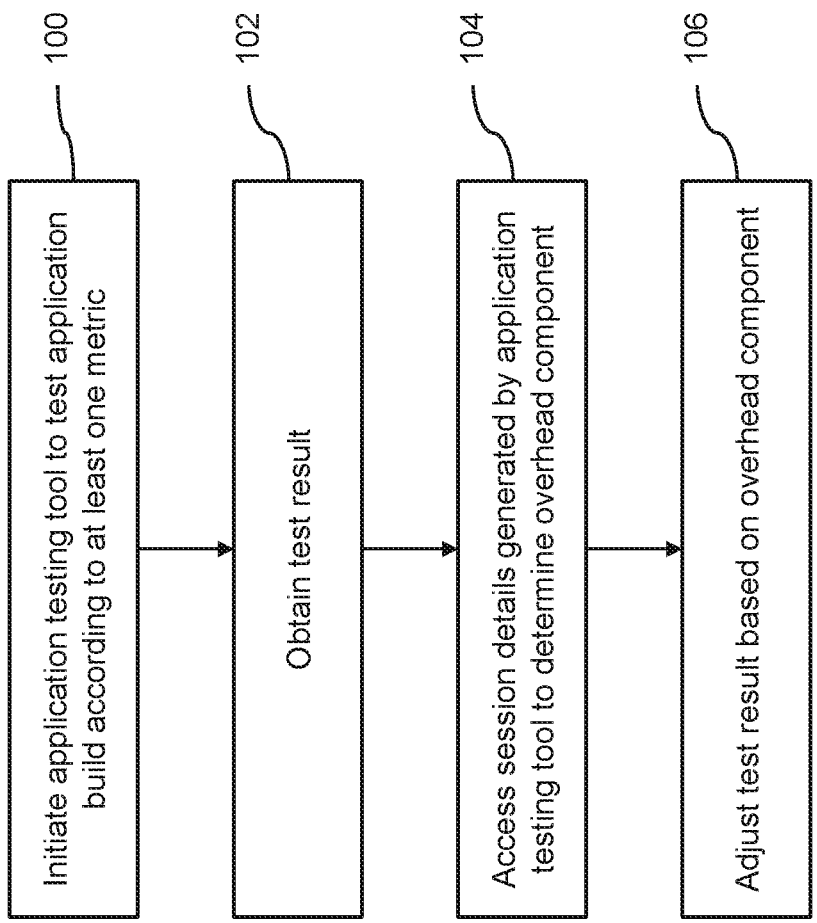
FIG. 7 is a flow diagram of an example of computer executable instructions for testing applications.

Referring to FIG. 7, an example embodiment of computer executable instructions for testing applications is shown. At block 100, the testing execution module 52 in the application testing environment 10 can initiate the application testing tool 57 to test an application build according to at least one metric. For example, the at least one metric may include an application launch time, a UI response time, application traffic, etc. The application build may be obtained, installed, and initiated by interfacing with the development environment interface 38, e.g., as discussed above. The application testing tool 57 obtains the test results at block 102, which results may be stored in the application test data 20. During the test 56, session details 59 can be collected and stored, which provide additional details for the testing execution module 52 to analyze with respect to the test 56 that has been executed. The testing execution module 52 may then access session details 39 generated by the application testing tool 57 at block 104, to determine an overhead component associated with the particular test 56. For example, the time taken for the driver of the application testing tool 57 to find an element, stored in the session details 59, can be retrieved to determine an overhead component. At block 106, the testing execution module 52 can adjust the test results based on the overhead component to generate a more accurate result. This can be done by accessing the results from the application test data 20 and adjusting that data or generating a copy with adjustments, that can be visualized using the dashboard 58 and/or sent in a report or other output to the application development environment 12.

Figure 8:
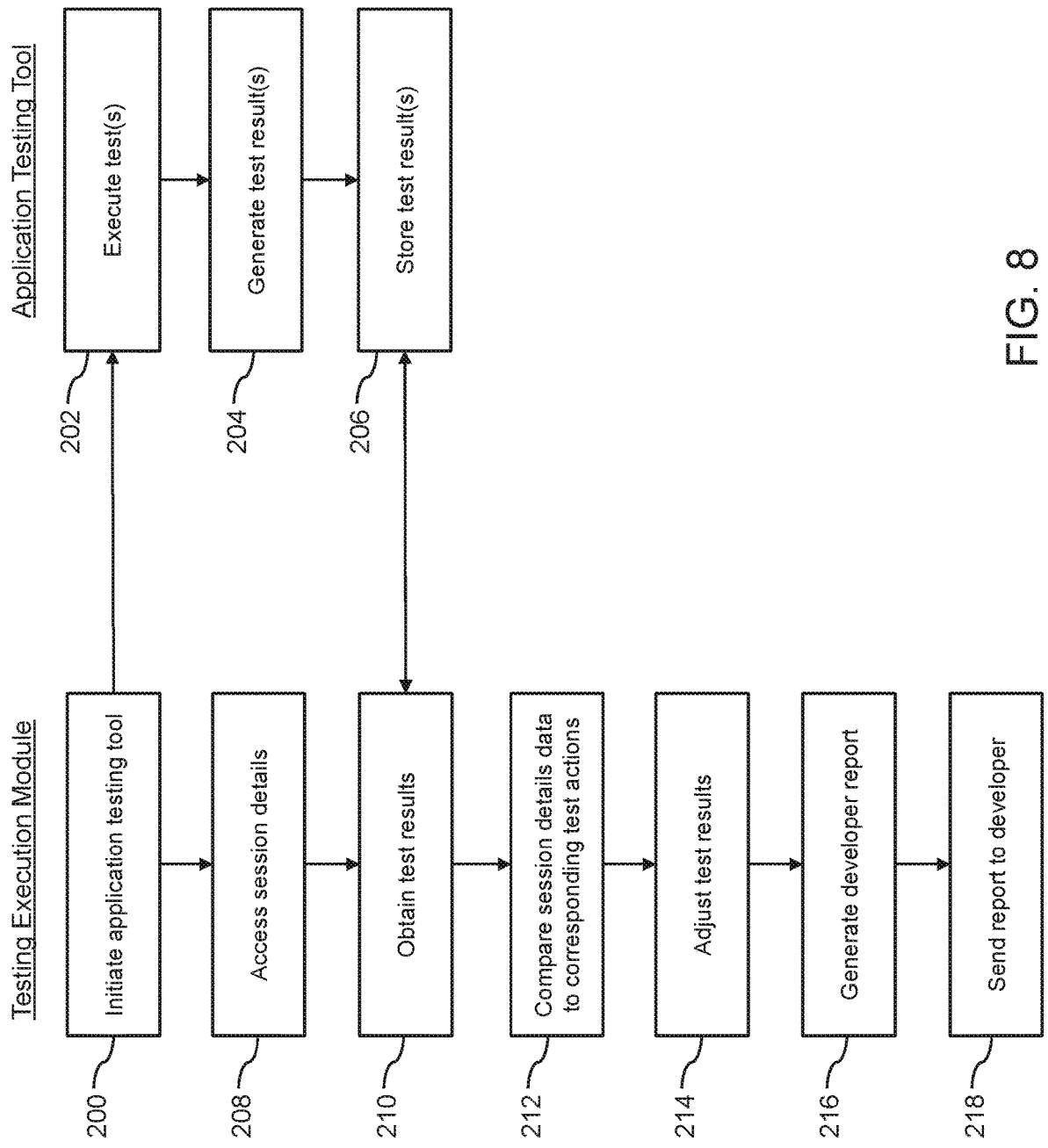
FIG. 8 is a flow diagram of an example of computer executable instructions for analyzing session details in parallel with a test being executed by the application testing tool.

Referring to FIG. 8, an example embodiment of computer executable instructions for analyzing session details in parallel with a test being executed by the application testing tool 57, is shown. At block 200, the testing execution module 52 initiates the application testing tool 57, by instructing or otherwise triggering the application testing tool 57 to execute one or more tests 56 at block 202. The application testing tool 57 may then proceed to generate the test results at block 204 and store the test results in the application test data 20 at block 206. In parallel to the operations that occur at blocks 202-206, the testing execution module 52 accesses the session details 59 at block 208. The testing execution module 52 may also receive, retrieve, request or otherwise obtain the associated test results at block 210. In this way, at block 212, the testing execution module 52 can compare the session details data generated by the application testing tool 57 while testing the application build, with the test results, to determine an overhead component introduced by the application testing tool 57 in generating the test results.

At block 214, the test results, or a copy thereof, can be adjusted to account for the overhead component and thus reflect more accurately the outcome of the test. For example, a UI load or response time that was affected by overhead introduced by the application testing tool 57 can be accounted for. In this example, at block 2016, a develop report can be generated, which can specify various details such as original test results, overhead component(s), revised/adjusted test results, etc. The developer report can therefore be generated and shared to enable the development team to have additional data in evaluating any further edits or revisions. It can be appreciated that the developer report generated at 216 can also be used by the application testing environment 10 to evaluate the accuracy and efficiency of the currently used application testing tool 57. Similarly, such reports can be sent to administrators or developers responsible for the application testing tool 57, e.g., an outside vendor. The developer report can then be sent to the developer(s) at block 218.

Figure 9:
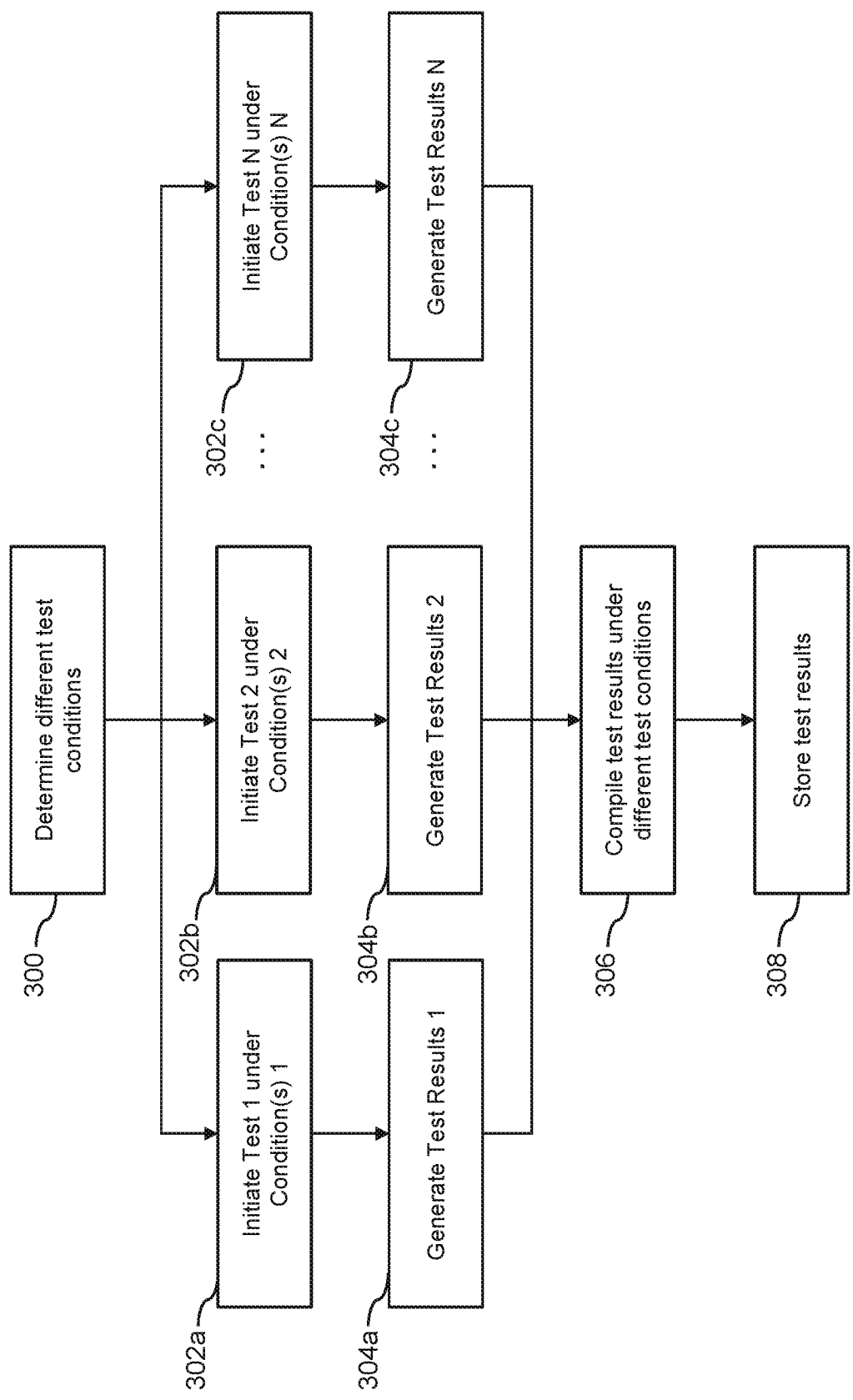
FIG. 9 is a flow diagram of an example of computer executable instructions for executing tests under a plurality of test conditions.

Referring now to FIG. 9, an example embodiment of computer executable instructions for executing tests under a plurality of test conditions, is shown. It can be appreciated that the operations shown in FIG. 9 can be implemented during, with or instead of blocks 202-206 in FIG. 8. The operations shown in FIG. 9 may be executed by the application testing tool 57 as part of its native functionality, may be part of a customization for the application testing environment 10, or may be executed under the direction of the testing execution module 52. At block 300, the application testing tool 57 determines the different test conditions or environments. These different test conditions can include the same app being tested on multiple different devices, operating system versions, or different conditions imposed upon a same device/device type, such as using different network types, processor speeds, etc. As such, the term "test condition" as used herein can refer generally to any device (hardware, software, etc.), network, server, or environmental condition or criterion that can affect the performance of an app.

In the example shown in FIG. 9, an arbitrary "N" number of conditions are being tested. As such, blocks 302a to 302c and 304a to 304c represent Tests 1 through N, associated with Conditions 1 through N, generating Test Results 1 through N. In this example, blocks 302a to 302c are associated with initiating the tests being conducted under the different conditions and blocks 304a to 304c are associated with generating the test results under those conditions. At block 306, the application testing tool 57 may compile the test results under the different test conditions, which may include concatenating, combining or linking the results under the different conditions to a particular app build. The test results may then be stored at block 308 in the application test data 20.

Figure 10:
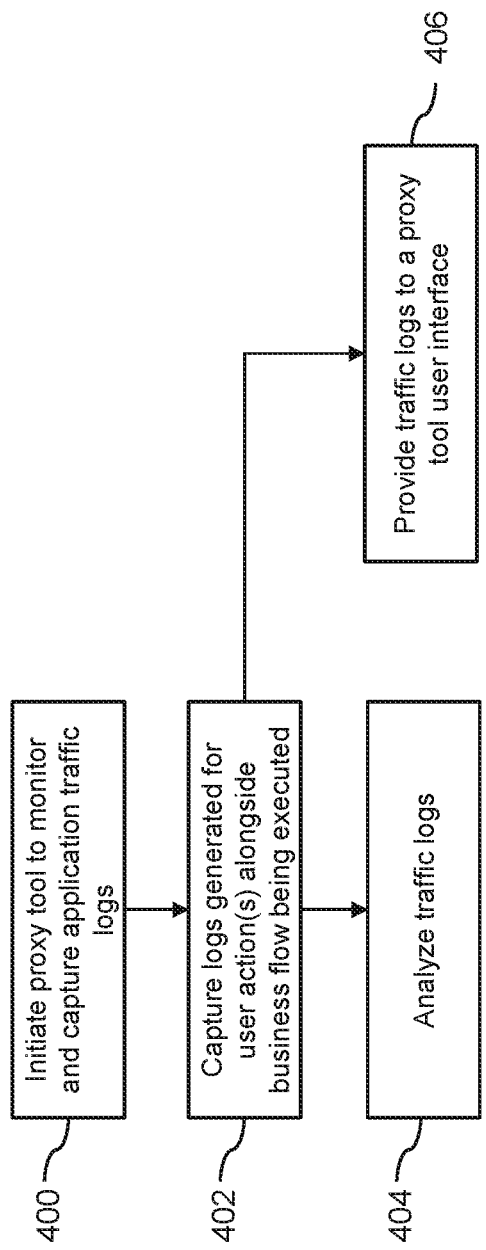
FIG. 10 is a flow diagram of an example of computer executable instructions for capturing application traffic flow using a proxy tool.

Referring now to FIG. 10, an example embodiment of computer executable instructions for capturing application traffic flow using a proxy tool, is shown. As discussed above, the proxy tool may be provided by the application testing tool 57 or a related software package for application traffic monitoring. At block 400, the testing execution module 52 can initiate the proxy tool to monitor and capture the application traffic logs. At block 402 the logs generated for user actions (i.e. those that would be relevant from the perspective of a user) can be captured alongside the business flow being executed on the test device 22 to simulate the experience of the user. These traffic logs can be analyzed at block 404 by the testing execution module 52 (e.g., in connection with block 212 from FIG. 8. The traffic logs can also be provided to the proxy tool UI at block 406 which, as discussed above, can be a separate UI or part of the dashboard 58.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of testing applications, the method comprising:
   initiating an application testing tool to test an application build running on at least one test device;
   obtaining a test result and storing (1) the test result and (2) related session details comprising a time taken for a driver to at least one of find an element or create a session from session details of the driver itself;
   accessing the stored session details while the application testing tool tests the application build;
   removing an overhead component in the test result, the overhead component being determined by comparing the session details generated by the application testing tool while testing the application build to the test result; and
   generating a report associated with the application build based on the removed overhead component, wherein the at least one test device runs in parallel with the application testing tool to determine the overhead component from the session details without adding additional overhead to the test.

2. The method of claim 1, further comprising:
   transmitting the adjusted test result to a third party vendor.

3. The method of claim 1, wherein the at least one metric comprises an application launch time or a user interface time.

4. The method of claim 1, further comprising:
   initiating a computer program running on a computing device to monitor and capture application traffic logs; and
   capturing in the session details, by the computer program, logs generated for a plurality of user actions, alongside a business flow being executed by the application under test.

5. The method of claim 1, wherein a plurality of tests are performed to obtain data under different conditions.

6. The method of claim 1, wherein the device is configured to test the application build in parallel on a plurality of device types.

7. The method of claim 1, further comprising:
   automatically requesting a latest application build from an application development environment, prior to initiating the application testing tool.

8. The method of claim 1, wherein testing the application build comprises one or more of an end-user performance test, a network performance test, or a server performance test.

9. A testing execution device for controlling testing of applications on test devices, the testing execution device comprising:
   a processor;
   a communications module coupled to the processor; and
   a memory coupled to the processor, the memory storing computer executable instructions that when executed by the processor cause the processor to:
      initiate an application testing tool to test an application build running on at least one test device;
      obtain a test result and store (1) the test result and (2) related session details comprising a time taken for a driver to at least one of find an element or create a session from session details of the driver itself;
      access the stored session details while the application testing tool tests the application build;
      remove an overhead component in the test result, the overhead component being determined by comparing the session details generated by the application testing tool while testing the application build to the test result; and
      generate a report associated with the application build based on the removed overhead component, wherein the at least one test device runs in parallel with the application testing tool to determine the overhead component from the session details without adding additional overhead to the test.

10. The device of claim 9, wherein the computer executable instructions further cause the processor to:
    transmit the adjusted test result to a third party vendor, wherein the application testing tool is maintained by the third party vendor.

11. The device of claim 9, wherein the at least one metric comprises an application launch time or a user interface response time.

12. The device of claim 9, wherein the computer executable instructions further cause the processor to:
    initiate a computer program running on a computing device to monitor and capture application traffic logs; and
    capture in the session details, by the computer program, logs generated for a plurality of user actions, alongside a business flow being executed by the application under test.

13. The device of claim 12, wherein the computer executable instructions further cause the processor to:
    provide the traffic logs to a proxy tool user interface.

14. The device of claim 9, wherein the computer executable instructions further cause the processor to:
    automatically request a latest application build from an application development environment, prior to initiating the application testing tool.

15. The device of claim 9, wherein testing the application build comprises one or more of an end-user performance test, a network performance test, or a server performance test.

16. The device of claim 15, wherein testing the application build comprises executing at least one test for each of a plurality of environments, the plurality of environments comprising one or more of a device environment, a network environment, or a server environment.

17. The device of claim 9, wherein a plurality of tests are performed to obtain data under different conditions.

18. The device of claim 9, wherein the device is configured to test the application build in parallel on a plurality of device types.

19. A non-transitory computer readable medium for testing applications, the computer readable medium comprising computer executable instructions for:

initiating an application testing tool to test an application build running on at least one test device;

obtaining a test result and storing (1) the test result and (2) related session details comprising a time taken for a driver to at least one of find an element or create a session from session details of the driver itself;

accessing the stored session details while the application testing tool tests the application build;

removing an overhead component in the test result, the overhead component being determined by comparing the session details generated by the application testing tool while testing the application build to the test result; and generating a report associated with the application build based on the removed overhead component, wherein the at least one test device runs in parallel with the application testing tool to determine the overhead component from the session details without adding additional overhead to the test.

20. The non-transitory computer readable medium of claim 19, wherein the at least one metric comprises an application launch time.

\* \* \* \* \*